United States Patent [19]

Itoh et al.

[11] Patent Number: 4,669,825

[45] Date of Patent: Jun. 2, 1987

[54] CONTROL APPARATUS WITH DELAY CIRCUIT FOR ANTIGLARE MIRROR

[75] Inventors: Hiroshi Itoh; Yasutoshi Suzuki, both of Oobu; Shinya Ohmi, Anjo; Tsuyoshi Fukada, Nagoya; Kunihiko Hara, Nukata, all of Japan

[73] Assignee: Nippondenso Co., Ltd., Kariya, Japan

[21] Appl. No.: 677,461

[22] Filed: Dec. 3, 1984

[30] Foreign Application Priority Data

Dec. 27, 1983 [JP] Japan .................. 58-251578

[51] Int. Cl.⁴ ............................................. G02F 1/133
[52] U.S. Cl. ...................................... 350/332; 350/278; 350/338
[58] Field of Search ............ 350/331 R, 332, 338, 350/278–281, 283

[56] References Cited

U.S. PATENT DOCUMENTS

| | | |
|---|---|---|
| 2,444,976 | 7/1948 | Brown . |
| 3,264,267 | 11/1962 | Collins . |
| 3,542,455 | 11/1970 | Jensen . |
| 3,600,060 | 2/1971 | Churchill . |
| 3,601,614 | 8/1971 | Platzer ........................ 350/279 X |
| 3,612,666 | 10/1971 | Rabinow ........................ 350/279 |
| 3,705,310 | 12/1972 | Wild . |
| 3,787,110 | 1/1974 | Berreman et al. . |
| 3,862,798 | 1/1975 | Hopkins ........................ 350/331 R |
| 3,869,196 | 3/1975 | Kubota . |
| 3,921,162 | 11/1975 | Fukai et al. . |
| 3,932,026 | 1/1976 | Spokel . |
| 3,944,331 | 3/1976 | Janning . |
| 3,961,181 | 6/1976 | Golden . |
| 3,976,875 | 8/1976 | Engstrom et al. . |
| 3,986,022 | 10/1976 | Hyatt . |
| 4,029,393 | 6/1977 | Dungan et al. . |
| 4,040,727 | 8/1977 | Ketchpel . |
| 4,095,217 | 6/1978 | Tani et al. . |
| 4,161,653 | 7/1979 | Bedini et al. ........................ 350/332 X |
| 4,200,361 | 4/1980 | Malvano . |
| 4,201,541 | 3/1980 | Jacob . |
| 4,202,607 | 5/1980 | Washizuka et al. . |
| 4,229,077 | 10/1980 | Schwab . |
| 4,266,859 | 5/1981 | Togashi . |
| 4,279,474 | 7/1981 | Belgorod . |
| 4,342,030 | 7/1982 | Shanks . |
| 4,390,874 | 6/1983 | Woodside . |
| 4,408,837 | 10/1983 | Kozaki et al. . |
| 4,443,057 | 4/1984 | Bechtel et al. ........................ 350/281 |
| 4,491,390 | 1/1985 | Tong-Shen . |
| 4,529,278 | 7/1985 | Nugget . |
| 4,530,571 | 7/1985 | Conner . |
| 4,580,875 | 4/1986 | Baur et al. ........................ 350/278 |

FOREIGN PATENT DOCUMENTS

| | | |
|---|---|---|
| 0070034 | 1/1983 | European Pat. Off. ............. 350/278 |
| 0111907 | 6/1984 | European Pat. Off. . |
| 2416172 | 10/1975 | Fed. Rep. of Germany . |
| 2604462 | 8/1977 | Fed. Rep. of Germany . |
| 2732727 | 3/1978 | Fed. Rep. of Germany . |
| 2808260 | 8/1979 | Fed. Rep. of Germany ...... 350/283 |
| 2111683 | 6/1972 | France . |
| 2513198 | 3/1983 | France ............................ 350/279 |
| 0040348 | 3/1977 | Japan . |
| 0039845 | 3/1980 | Japan . |
| 0149902 | 11/1980 | Japan ............................ 350/278 |
| 55-149902 | 11/1980 | Japan . |
| 0004003 | 1/1982 | Japan . |
| 0102603 | 6/1982 | Japan . |
| 490516 | 10/1937 | United Kingdom . |
| 2029343 | 3/1980 | United Kingdom ............ 350/331 R |

*Primary Examiner*—John K. Corbin
*Assistant Examiner*—David Lewis
*Attorney, Agent, or Firm*—Cushman, Darby & Cushman

[57] ABSTRACT

A control apparatus for a reflection mirror of a vehicle is disclosed. The control apparatus is provided with a rear light sensor, an exterior light sensor and a circuit for driving the reflection mirror into a dazzle-free condition when it is detected by the sensors that an intensive rear light is incident from the rear of the vehicle and the exterior of the vehicle is dark. The control apparatus is further provided with a delay circuit which delays driving the reflection mirror into the dazzle-free condition for a predetermined interval of time after the exterior light sensor detects that the exterior of the vehicle is dark. The exterior light sensor may be a switching circuit which switches on and off front light bulbs of the vehicle. The control apparatus is still further provided with a delay circuit which keeps the dazzle-free condition for a predetermined interval of time even after the rear light sensor detects that the rear of the vehicle is dark.

16 Claims, 4 Drawing Figures

CONTROL APPARATUS WITH DELAY CIRCUIT FOR ANTIGLARE MIRROR

BACKGROUND OF THE INVENTION

The present invention relates to a control apparatus for a reflection mirror of a vehicle which automatically effectuates a dazzle-free operation of the reflection mirror such as an interior rear view mirror in accordance with a light incident from the rear of the vehicle.

A dazzle-free reflection mirror employing a liquid crystal panel has been suggested which, by means of a rear light detecting sensor for detecting a light incident from the rear of the vehicle and a front light detecting sensor for detecting a light incident from the front of the vehicle, activates the liquid crystal panel to an opaque condition for effectuating a dazzle-free operation of the reflection mirror when the front and the rear of the vehicle are dark and bright, respectively (for instance, the vehicle runs at night and receives an intensive light from front light bulbs of the following vehicle).

It is disadvantageous however that, when the vehicle enters into a tunnel or a garage where the front of the vehicle is dark and the rear of the vehicle (tunnel entrance or garage entrance) is bright, the reflection mirror is turned into the dazzle-free condition and degrades a rear view image formed on the reflection mirror. That is, as soon as the vehicle enters into the tunnel at which time the eyes of a vehicle driver are not adapted enough to the darkness of the tunnel and the driver does not feel the brightness at the tunnel entrance dazzling, the dazzle-free operation is effectuated and hence the rear view image on the reflection mirror cannot be assured.

Further, undesired repetition of the dazzle-free operation occurs when the intensity of light incident from the rear of the vehicle becomes high and low repeatedly.

SUMMARY OF THE INVENTION

It is an object of the present invention to provide a control apparatus for a reflection mirror of a vehicle which assures a satisfactory rear view image on the reflection mirror even when the front of the vehicle suddenly becomes dark upon entering into a tunnel, for instance.

It is a further object of the present invention to provide a control apparatus for a reflection mirror of a vehicle which prevents repetition of dazzle-free operation even when the intensity of rear light becomes high and low repeatedly.

According to the present invention, in a control apparatus for a reflection mirror of a vehicle which effectuates a dazzle-free operation of the reflection mirror when the dark condition at the exterior of said vehicle is detected and the rear light in excess of a predetermined intensity is detected, the dazzle-free operation of said reflection mirror is disabled for a predetermined interval of time after a change from the bright to dark condition at the exterior of said vehicle is detected.

The dazzle-free operation of said reflection mirror is maintained for a predetermined interval of time after a change in rear light intensity from high to low level.

DETAILED DESCRIPTION OF THE INVENTION

Figure 1:
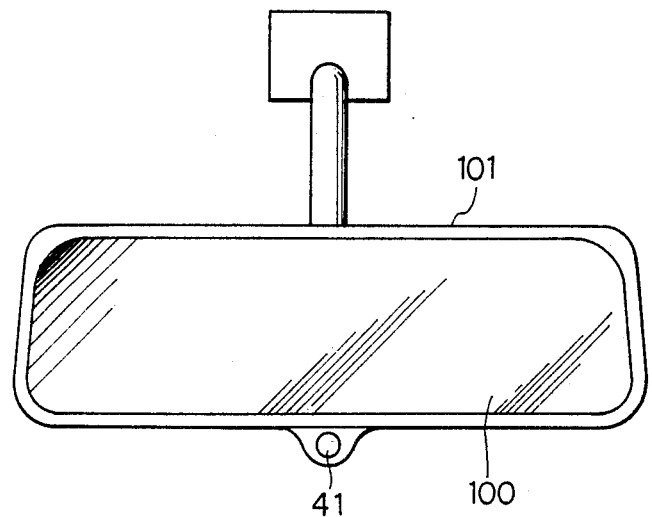
FIG. 1 is a front view of an interior rear view mirror controlled by a control apparatus according a first and second embodiments of the present invention.

The present invention will be described hereinunder with reference to the embodiments shown in the drawings.

As shown in FIG. 1, an interior rear view mirror 101 attached to a front wind-shield glass of a vehicle primarily comprises a liquid crystal panel 100 provided on a front surface of the interior mirror 101 and a thin reflection film made of metal such as chrome provided on the rear of the liquid crystal panel 100. The liquid crystal panel 100 has at least two planar transparent electrodes and a liquid crystal enclosed therebetween so that an intensity of light reflected by the interior mirror 101 is reduced when a transparency of the liquid crystal is changed by application of an alternating current voltage to the transparent electrodes. The liquid crystal is in a transparent condition when no voltage is applied to the transparent electrodes, and the interior mirror 101 reflects the entire light incident from the rear of the vehicle. A rear light sensor 41 is provided at a front lower end of the interior mirror 101 to detect an intensity of light incident from the rear of the vehicle.

Figure 2:
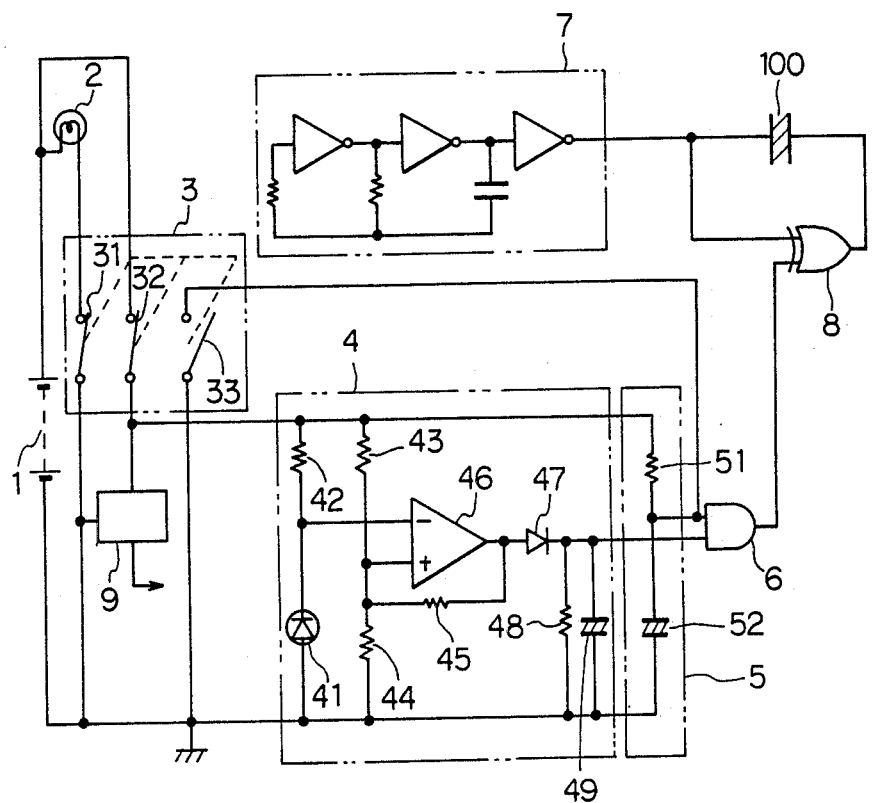
FIG. 2 is an electric wiring diagram of a control apparatus according to a first embodiment of the present invention.

In the electric wiring diagram of FIG. 2, numeral 1 designates a battery mounted on the vehicle, 2 front light bulbs, and 3 a front light switch for activating the front light bulbs 2 when the vehicle exterior is dark. As shown in the Figure, switches 31, 32 and 33 of the front light switch 3 are linked with each other to be operated simultaneously.

Numeral 4 designates a rear light detecting circuit which comprises a photo diode 41 used as the rear light sensor shown in FIG. 1 for detecting the light incident from the rear of the vehicle, a resistor 42 connected to the photo diode 41 for producing at a junction with the diode 41 a detection voltage indicative of the detected intensity of the light, resistors 43 and 44 for producing a reference voltage indicative of a predetermined intensity of light, a comparator 46 for comparing the detection voltage with the reference voltage, a resistor 45 for providing the comparator 46 with a hysteresis function, a diode 47 for preventing a reverse current flow, and a resistor 48 and a capacitor 49 having in combination a first time constant of a few seconds (e.g. 2 seconds).

Numeral 5 designates a disabling circuit which comprises a resistor 51 and a capacitor 52 having in combination a second time constant of about 10 seconds. Numeral 6 designates an AND circuit which receives signals from the rear light detecting circuit 4 and the disabling circuit 5.

Numeral 7 designates an oscillation circuit for producing an oscillation signal at a fixed frequency, 8 an exclusive-OR circuit which receives signals from the oscillation circuit 7 and the AND circuit 6, and 100 the liquid crystal panel described above with reference to FIG. 1. Numeral 9 designates a stabilized voltage supply circuit for supplying the comparator 46, the AND circuit 6, inverters of the oscillation circuit 7 and the exclusive-OR circuit 8 with a stabilized voltage.

Operation of the above-described embdodiment will be described next.

With the front light switch 3 being turned to OFF condition (the switches 31 and 32 are turned off, while the switch 33 is turned on) because of the running in the daytime, the stabilized voltage supply circuit 9 is not supplied with any voltage to disable oscillation of the oscillation circuit 7 and hence the liquid crystal panel 100 to which no voltage is applied remains transparent. As a result, the interior mirror 101 reflects the entire light incident from the rear of the vehicle so that the rear view image on the interior mirror 101 is assured.

Assuming that the front light switch 3 then is turned to ON condition (the switches 31 and 32 are turned on, while the switch 33 is turned off) to assure the visibility of the front of the vehicle upon entering into a tunnel, the stabilized voltage supply circuit 9 supplied with the voltage from the battery supplies each circuits with the stabilized voltage and the rear light detecting circuit 4 and the disabling circuit 5 supplied with the voltage from the battery through the switch 32 become operative.

In the rear light detecting circuit 4, since the photo diode 41 detects the light incident from the tunnel entrance, the detection voltage at the junction between the diode 41 and the resistor 42 becomes lower than the reference voltage established by a voltage division by the resistors 43 and 44. An output voltage of the comparator 46 resultantly becomes high and a high level voltage is applied to the AND circuit 6.

In the disabling circuit 5, on the other hand, since the voltage supplied from the battery 1 through the switch 32 is delayed for about 10 seconds, a low level voltage is applied to the AND circuit 6. As a result, an output voltage of the AND circuit 6 is kept low.

The oscillation circuit 7 supplied with the stabilized voltage from the stabilized voltage supply circuit 7 keeps oscillating. The oscillation signal is applied to one of the electrodes of the liquid crystal panel 100 and to the exclusive-OR circuit 8. Here it should be noted that, since the output voltage of the AND circuit 6 is low, the output voltage of the exclusive-OR circuit 8 is in the same phase relation with the oscillation signal from the oscillation circuit 7. As a result, the liquid crystal panel 100 to which no voltage is applied maintains transparency. Thus, when the vehicle has just entered into the tunnel, dazzle-free operation of the interior mirror 101 is disabled so that the rear view image on the interior mirror 101 is assured.

With the lapse of a predetermined interval of time, about 10 seconds, thereafter, the output voltage of the disabling circuit 5 changes from low to high. Provided that the output voltage of the rear light detecting circuit 4 is maintained high at this moment due to the intensive light generated by the front light bulbs of the following vehicle and incident from the rear of the vehicle, the output voltage of the AND circuit 6 changes to high. With the high level output voltage from the AND circuit 6, the output voltage of the exclusive-OR circuit 8 changes to be in opposite phase relation with the oscillation signal of the oscillation circuit 7 so that the liquid crystal panel 100 to which the alternating current voltage is applied reduces the transparency. As a result, the interior mirror 10 is put into the dazzle-free operation to prevent dazzling of the light incident from the rear of the vehicle.

It should be noted in the above-described embodiment that, as well as the running through the tunnel, the interior mirror 101 may be put into the dazzle-free operation to prevent dazzling of the light incident from the rear of the vehicle when the light generated from the front light bulbs of the following vehicle and incident from the rear of the vehicle becomes intensive during the running at night in the same manner as described above.

It should be noted further that, although the output voltage of the comparator 46 alternately changes between the high and low levels due to changes in the intensity of the light incident to the photo diode 41 when the front light of the following vehicle running on a bumpy road at night vibrates, the output voltage changes are smoothed out by the resistor 48 and the capacitor 49 and the high level output voltage is kept applied to the AND circuit 6. Thus the dazzle-free operation is maintained at this time and undesired repetition of the dazzle-free operation is prevented. For this reason, dazzling on the front surface of the liquid crystal panel 100 is prevented and the driver will not be disturbed.

The second embodiment of the present invention will be described hereinunder.

Figure 4:
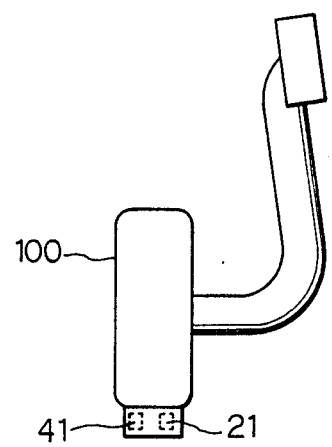
FIG. 4 is a side view of an interior rear view mirror controlled by a control apparatus according to a second embodiment of the present invention shown in FIG. 3.
Figure 3:
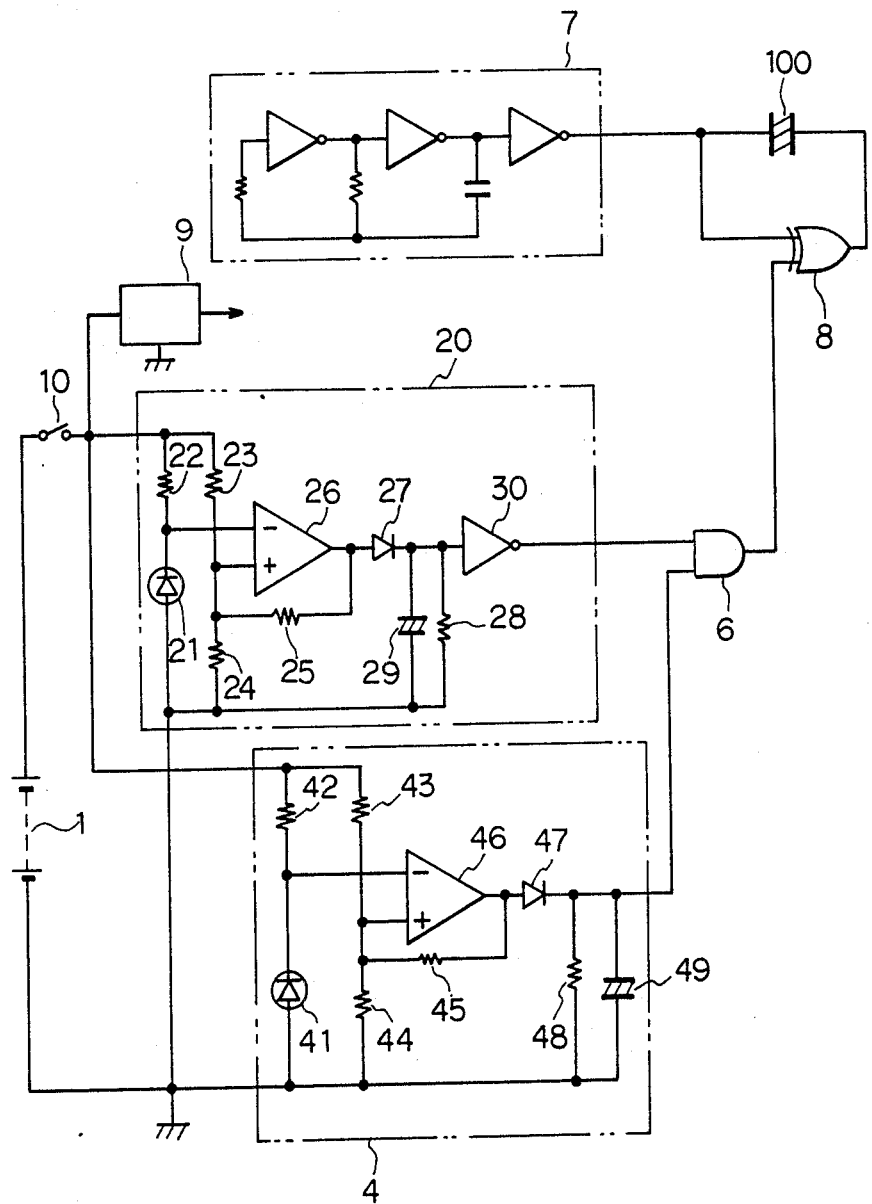
FIG. 3 is an electric wiring diagram of a control apparatus according to a second embodiment of the present invention.

FIG. 3 is an electric wiring diagram of the second embodiment. This embodiment is different from the first embodiment in that, independently of the operation of the front light bulbs, the liquid crystal panel 100 is put into the dazzle-free operation in accordance with the light at the front of the vehicle, or the brightness at the vehicle exterior, while an ignition switch is turned on. For this purpose, each circuits are arranged to be supplied with the voltage from the battery 1 through the ignition switch 10 and a front light detecting circuit 20 is provided for detecting the light at the front of the vehicle. A photo diode 21 is provided, as shown in FIG. 4, at a rear bottom of the interior mirror 101 for detecting the light incident from the front of the vehicle.

As shown in FIG. 3, the front light detecting circuit 20 comprises the photo diode 21 for detecting the light incident from the front of the vehicle, a resistor 22 connected to the photo diode 21 for producing at a junction with the diode 21 a detection voltage indicative of detected intensity of light, resistors 23 and 24 for producing a reference voltage indicative of a predetermined intensity of light, a comparator 26 for comparing the detection voltage with the reference voltage, a resistor 25 for providing the comparator 26 with a hysteresis function, a diode 27 for preventing reverse current flow, a resistor 28 and a capacitor 29 having in combination the second time constant of about 10 seconds, and an inverter 30.

Operation of the second embodiment will be described next.

Since the voltage from the battery 1 is not supplied to each circuits while the ignition switch 10 is not turned on, the liquid crystal panel 100 maintains the transparent condition and the interior mirror 101 is not in the dazzle-free condition but in the normal condition.

Provided that the ignition switch 10 is turned on, the voltage from the battery 1 is supplied to each circuits. If, at this time, it is in the daytime in which vehicle exterior is bright, the photo diode 21 detects the light at the vehicle exterior and the detection voltage at the junction between the resistor 21 and the resistor 22 becomes lower than the reference voltage established by the resistors 23 and 24 so that the output voltage of the comparator 26 becomes high. As a result, the output voltage of the inverter 30 becomes low and resultantly the output voltage of the AND circuit 6 becomes low. Thus, no voltage is applied to the liquid crystal panel 100 and resultantly the interior mirror 101 is not put into the dazzle-free condition. That is, no dazzle-free operation is performed while the vehicle exterior is bright.

Assuming that the vehicle enters into the tunnel under this condition, the front of the vehicle gets dark and the diode 21 which detects this darkness renders the comparator 26 to produce the low output voltage. The output voltage of the inverter 30, however, is maintained low by the time delay operation of the resistor 28 and the capacitor 29 for about 10 seconds. As a result, the interior mirror 101 is forced not to perform the dazzle-free operation when the vehicle has just entered into the tunnel.

At a time when about 10 seconds has passed thereafter and the eyes of the driver are adapted to the darkness in the tunnel, the time delay operation of the resistor 28 and the capacitor 29 is finished and the output voltage of the inverter 30 becomes high. If the rear light detecting circuit 4 produces the high level output voltage in response to the intensive light generated by the front light bulb of the following vehicle and incident from the rear of the vehicle, the output voltage of the AND circuit 6 becomes high to apply the alternating current voltage to the liquid crystal panel 100 and resultantly the interior mirror 101 is put into the dazzle-free operation.

It would be understood that, since the front light detecting circuit 20 produces the high level output voltage when the vehicle runs at night, the dazzle-free operation is performed in accordance with the light incident from the rear of the vehicle in the same manner as in the above-described first embodiment.

In such a case as running in a forest where the front of the vehicle becomes bright and dark alternately because of shades of trees, since the output voltage of the inverter 30 is kept low by the time delay operation of the resistor 28 and the capacitor 29 in the front light detecting circuit, unnecessary dazzle-free operation of the interior mirror 101 can be prevented.

It should be noted in the above-described embodiment that, although the invention is applied to an interior mirror used as a reflection mirror, it may be applied to side mirrors such as door mirrors as well.

Further, though photo diodes are used as photo sensors in the embodiments, CdS, CdSe or photo conductive elements using semiconductors such as an amorphous silicon may be used. A photo transistor, phototube or pyroelectric element may be used as well.

Still further, means for detecting brightness/darkness at the exterior of the vehicle need not be attached to the mirror but may be provided on a dashboard and may be used for an apparatus which automatically turns on light bulbs when it gets dark. Further, brightness/darkness at the surrounding area may be detected by a light bulb turn-on signal in this sort of apparatus.

Still further, though liquid crystal is used in the mirror to perform the dazzle-free operation, other materials such as an electrochromic may be used as long as the transparency thereof changes with the application of a voltage. Further, the reflection mirror may be switched to its dazzle-free condition electromagnetically (mechanically) without using such materials.

What we claim is:
1. A control apparatus for a vehicle mirror switchable to and from a dazzle-free condition comprising:
   rear light detecting means for detecting intensity of light incident from the rear of said vehicle;
   means for determining intensity of light exterior of said vehicle;
   driving means for driving said mirror into a dazzle-free condition when the detected intensities of the rear light and the exterior light are above and below predetermined intensities, respectively; and
   means for delaying the driving operation of said driving means for a predetermined interval of time in response to the detected intensity of the exterior light being reduced below the predetermined intensity but not delaying the driving operation of said driving means when the intensity of exterior light is increasing.
2. A control apparatus according to claim 1, wherein said determining means comprises a switching circuit for switching on and off front light bulbs of said vehicle.
3. A control apparatus according to claim 2, wherein said delaying means comprises a delay circuit connected to said switching circuit for delaying an application of an output of said switching circuit indicative of switching-on of said front light bulbs to said driving means.
4. A control apparatus according to claim 3, wherein said mirror includes a liquid crystal panel the transparency of which reduces for dazzle-free operation upon receiving an alternating current voltage, and wherein said driving means includes a circuit connected to said rear light detecting means and said delay circuit for applying said alternating current voltage to said liquid crystal panel.
5. A control apparatus according to claim 4, wherein said driving means comprises an oscillator for producing an oscillation signal at a fixed frequency, and a gate for applying said alternating current voltage to said liquid crystal panel in response to said oscillation signal.
6. A control apparatus according to claim 5, wherein said rear light detecting means comprises:
   a photo sensor for producing an output indicative of the intensity of the rear light incident thereto,
   a comparator connected to said photo sensor for comparing the output of said photo sensor with a reference value indicative of the predetermined intensity of the rear light, and
   a smoothing circuit connected to said comparator for smoothing an output of said comparator.
7. A control apparatus according to claim 1, wherein said exterior light detecting means comprises:
   a photo sensor for producing an output indicative of the intensity of the exterior light incident thereto, and
   a comparator connected to said photo sensor for comparing the output of said photo sensor with a reference value indicative of the predetermined intensity of the exterior light.
8. A control apparatus according to claim 7, wherein said disabling means comprises a delay circuit connected to said comparator for delaying an output of said comparator.
9. A control apparatus according to claim 3, wherein said reflection mirror includes a liquid crystal panel which reduces transparency thereof for dazzle-free operation upon receiving an alternating current voltage, and wherein said driving means includes a circuit connected to said rear light detecting means and said delay circuit for applying said alternating current voltage to said liquid crystal panel.

10. A control apparatus according to claim 9, wherein said driving means comprises an oscillator for producing an oscillation signal at a fixed frequency, and a gate for applying said alternating current voltage to said liquid crystal panel in response to said oscillation signal.

11. A control apparatus for a vehicle mirror including an electrically-controlled panel the transparency of which reduces in accordance with a voltage applied thereto, said control apparatus comprising:
   first means for producing a first output indicating that an intensive light is incident on the mirror from the rear of said vehicle;
   second means for producing a second output indicating that the exterior of said vehicle is dark;
   third means for delaying the second output produced from said second means for a predetermined interval of time in response to the intensity of exterior light being reduced, but not in response to the intensity of exterior light being increased; and
   fourth means for changing the voltage applied to said electrically-controlled panel to reduce the transparency in response to the first output and the delayed second output so that said reflection mirror is driven into a dazzle-free condition.

12. A control apparatus according to claim 11,
   wherein said electrically-controlled panel comprises a liquid crystal panel the transparency of which reduces upon application of an alternating current voltage thereto, and
   wherein said fourth means includes an oscillator for producing an oscillation signal at a fixed frequency and a circuit for applying said alternating current voltage to said liquid crystal panel in response to the oscillation signal upon receipt of the first output and the delayed second output.

13. A control apparatus according to claim 12, wherein said first means includes
   a photo sensor for detecting intensity of the rear light incident from the rear of said vehicle, and
   a smoothing circuit connected to said photo sensor for smoothing an output of said photo sensor.

14. A control apparatus according to claim 12, wherein said second means includes a switching circuit for switching on and off front light bulbs of said vehicle.

15. A control apparatus according to claim 12, wherein said second means includes a photo sensor for detecting intensity of exterior light present exterior of said vehicle.

16. A control apparatus for a reflection mirror of a vehicle including an electrically-controlled panel the transparency of which changes in accordance with an electric signal applied thereto, said control apparatus comprising:
   rear light sensing means for producing a first and second outputs indicative of sensed intensity of rear light above and below a predetermined level, respectively;
   front exterior light sensing means for producing third and fourth outputs indicative of sensed intensity of front exterior light above and below a predetermined level, respectively;
   first delay means for delaying an output change of said front exterior light sensing means from the third output to the fourth output for a predetermined interval of time;
   second delay means for delaying an output change of said rear light sensing means from the first output to the second output for a predetermined interval of time; and
   driving means for changing the electric signal applied to said electrically-controlled panel so that the transparency of said electrically-controlled panel is maintained low only in response to the first output of said rear light sensing means and the fourth output of said front exterior light sensing means.

* * * * *